June 18, 1963   E. KRAMAR ETAL   3,094,697
FREQUENCY MODULATED APPROACH BEACON
Filed April 18, 1961   2 Sheets-Sheet 1

INVENTORS
E. KRAMAR - F. STEINER

BY

ATTORNEY

June 18, 1963  E. KRAMAR ETAL  3,094,697
FREQUENCY MODULATED APPROACH BEACON
Filed April 18, 1961  2 Sheets-Sheet 2

INVENTORS
E. KRAMAR - F. STEINER
BY
ATTORNEY

United States Patent Office 3,094,697
Patented June 18, 1963

3,094,697
FREQUENCY MODULATED APPROACH BEACON
Ernst Kramar and Fritz Steiner, both of Pforzheim, Germany, assignors to International Standard Electric Corporation, New York, N.Y., a corporation of Delaware
Filed Apr. 18, 1961, Ser. No. 103,805
Claims priority, application Germany Apr. 27, 1960
8 Claims. (Cl. 343—106)

This invention relates to an approach beacon for determining a characteristic approach direction, in the course of which at the receiving end the frequency-modulation (Doppler-effect) of a carrier wave is utilized, which is caused by the fact that the antennas in the array or antenna base are arranged along a linear path at a certain spaced relation, and are fed with high-frequency energy in a cyclical succession via a switching arrangement.

At a distant receiving site there is noticed from such a transmitting arrangement a frequency modulation whose deviation, with respect to amplitude and sign, is dependent upon the deviation from the normal line to the antenna array. However, in the direction vertical to the antenna array, this deviation in any case equals zero.

An approach beacon is known in which several antennas arranged along a linear path, are successively fed with radio frequency energy of a certain carrier frequency. After having switched the last antenna, the first one is switched on again. One single antenna which is preferably disposed in the centre of the linear arrangement, radiates a further fixed carrier frequency which, with respect to frequency, ranges e.g. in the middle of either the maximum or minimum Doppler-frequency to be expected on account of the switching (coupling) frequency. This fixed frequency, in the conventional type of system, may also be equal to the maximum Doppler-frequency to be expected for determining one single direction. In any case beat frequencies appear at the receiving end by the interference of the two RF voltages in which case the beat frequency zero indicates the correct directions. If the carrier frequency is in the middle, then the correct directions are on both sides of the antenna array on the mid-vertical line in relation thereto. If the carrier frequency is chosen equal to the maximum frequency which is to be expected on account of the velocity at which the antennas are fed with energy, then the beat frequency zero indicates one single direction along the linear antenna arrangement.

It is an object of the present invention to provide an approach beacon (localizer) operating with a frequency modulation by utilizing the well-known properties of a linear antenna system, whose individual antennas are fed periodically with energy one at a time in turn. For receiving the signals of this approach beacon the receivers are supposed to be suitable without alteration for receiving the signals of the VOR-beacon systems operating with an amplitude modulation.

It is a feature of this invention that an approach beacon or localizer comprises a linear antenna system suitable for use in a VOR navigation system which consists of a plurality of single antennas arranged in a certain spaced relation which, for the purpose of producing a frequency modulation capable of being evaluated by a VOR receiver for determining direction, are fed with RF energy one at a time in turn with the aid of switching means, e.g. in such a way that the velocity of coupling or switching the single antennas is in accordance with a sinusoidal function of time.

It is a further feature that the approach beacon operates in such a way that the VOR receivers which are normally installed in aircraft are also suitable for receiving the signals of the approach beacon without requiring any alteration and accordingly, the degree of modulation of the carrier wave of about 30 percent which is required by ICAO (International Civil Aviation Organization) standards with a frequency of 9960 c.p.s. is adhered to and both the reference phase signal and the variable phase signal or frequency modulation deviation cycle amount to 30 c.p.s.

The above-mentioned and other features and objects of this invention will become more apparent by reference to the following description taken in conjunction with the accompanying drawings, in which.

Figure 4A:
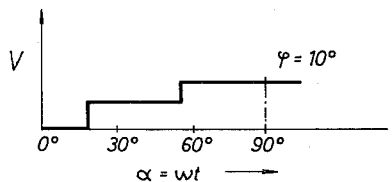
Figure 4B:
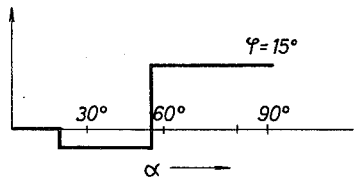
Figure 4C:
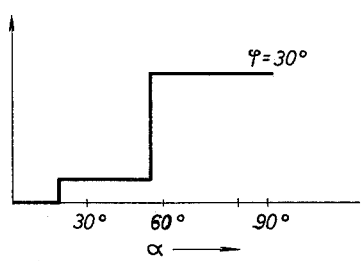
Figure 3:
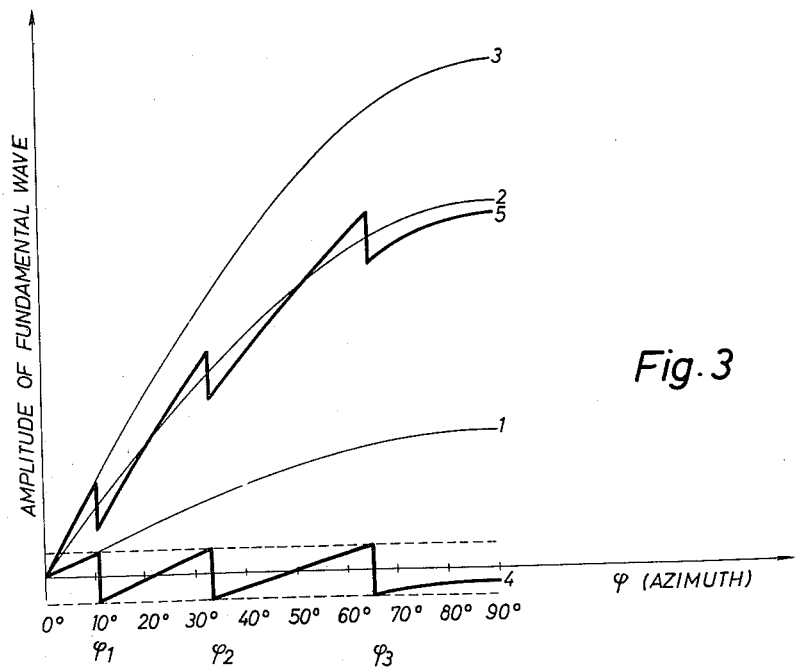

FIG. 3 shows individual frequency-deviation diagrams of respectively the amplitudes of the fundamental frequency of the switching frequency plotted in cartesian coordinates versus the drift angle from the course-setting beam (azimuth $\varphi$); and FIGS. 4a–4c show the curves of the low frequency voltage appearing at the output of the VOR receiver frequency discriminator plotted with respect to different values of $\varphi$ as a function of time.

The Doppler VOR is one which produces radiated information to which the present standard VOR receiver, without modifications, reacts as it did to the 4-loop and similar VOR systems. It has the advantage of having much less susceptibility to course deterioration due to sitting conditions. This is due to the basic manner in which the variable phase voltage is now produced.

The specifications for a VOR ground system are, in part, that it contain two modulation voltages having a frequency of 30 c./s. In order to keep these voltages separate and distinct, so that they may eventually be compared in phase angle by the receiver, one in transmitted as 30 c./s. amplitude modulation, while the second is applied to a 9960 c./s. sub-carrier as frequency modulation, and the sub-carrier transmitted as amplitude modulation. One of these voltages must have a phase which varies directly with azimuth angle, while the other must have a phase which is constant with azimuth. In the present (i.e. 4-loop) system, the 30 c./s. voltage which is transmitted as amplitude modulation varies in phase angle with azimuth, and is called the "variable" voltage. The 30 c./s. component of the sub-carrier voltage is called the "reference" voltage.

VOR specifications require that the characteristics of the frequency modulated sub-carrier be as follows: center frequency—9960 c./s.; deviation—±480 c./s.; rate of recurrence of one complete cycle of frequency deviation—30 times per second. The Doppler effect is used to, in part, produce this type of voltage by way of producing the ±480 c./s. deviation.

The "Doppler effect" is a well-known phenomenon wherein the received frequency of periodic wave radiation from a moving source is altered by this movement; that is, if the source is moving towards the receiver, the received frequency will be higher than the radiated frequency, and, conversely, will be lower when the source is moving away. This is illustrated in the classic example of the change in pitch of the sound of a train whistle as it passes by.

Figure 1:
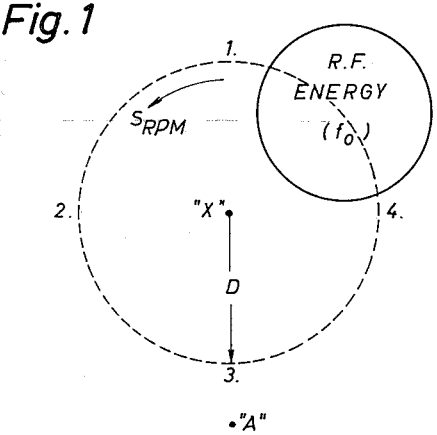
FIG. 1 is a diagram useful in describing the Doppler VOR.

In the Doppler VOR, an antenna could conceivably be rotated about a central point in order to create the moving radiator. (In practice, quasi-rotation is resorted to.) Referring to FIGURE 1 and to illustrate more clearly the operation of Doppler VOR, there is supposed such an antenna with a circular pattern, radiating energy at a radio frequency of $f_0$. It is rotated about point "X" at a speed of S r.p.m. and at a distance of D wavelengths from X. The received frequency will therefore be above, below or equal to $f_0$, depending on whether the antenna, as it rotates, is moving toward, away from, or at right angles to a line to, the receiver. The deviation from $f_0$ is proportional to the product of "D" and "S." Since the frequency modulation deviation cycle must occur once every thirtieth second, "S" is fixed at 30 c./s., or 1800 r.p.m. In order to produce a deviation of ±480 c./s., "D" must be approximately 2.5 wavelengths, or about 22 feet at the mean VOR operating frequency of 115 mc./s.

In FIG. 1, the frequency of the received voltage at point "A," as the antenna rotates past point 1, 2, 3 and 4 is: $f_0$, $f_0+480$ c./s., $f_0$, and $f_0-480$ c./s., respectively.

To complete the specified characteristics of the frequency modulated sub-carrier, it is necessary to add a fixed antenna at point "X." This antenna also has a circular radiation pattern and is made to radiate a frequency of $f_c$, wherein the difference between $f_0$ and $f_c$ is 9960 c./s. The beating of these two voltages in the receiver effectively produces a carrier ($f_c$) which is amplitude modulated by a 9960 c./s. sub-carrier that is, in turn, frequently modulated. The percentage of modulation of the carrier by the sub-carrier is set for 30%, and is adjusted by setting the proper ratio of power radiated from the fixed and rotating antennas.

Since any reference point (e.g. the high frequency point) in the frequency deviation cycle now moves about with the azimuth of the receiver, the phase of the 30 c./s. component of the sub-carrier also changes with azimuth, and this voltage now becomes the "variable" voltage. The fixed phase, or "reference" voltage, is established by amplitude-modulating the carrier radiated from the central antenna with a 30 c./s. voltage. Since these two components have interchanged roles with respect to which is the "reference" voltage and which the "variable" voltage, it is necessary that the moving antenna be rotated in a counter-clockwise direction. Since the receiver does not recognize this name change, and responds only to the relative phase between the two voltages, it is appropriate to refer to these voltages by their relationship to the carrier. Therefore, they may be referred to as the "AM 30 c./s. voltage" and the "FM 30 c./s. voltage." (The terms "variable voltage" and "reference voltage" must continue to denote the voltage which varies in phase with azimuth, and the voltage which has a fixed phase, respectively, but should be employed—in "Doppler VOR" discussion—in combination with the terms in the preceding sentence because of possible confusion due to the former association of these terms with ground and airborne circuits.)

As indicated above, the rotating antenna must be spun at 1800 r.p.m. at the end of an arm 22 feet long. Obviously, this would be extremely difficult to accomplish physically. Instead, 50 antennas are spaced equally around the periphery of a circle 22 feet in radius. These are fed, in turn, by a distributor rotating at 1800 r.p.m. which employs a capacitor coupling, and feeds each antenna in approximately a sinusoidal pattern when its turn comes up. This, in combination with the use of 50 antennas, helps to produce a pattern which has a constant amplitude and angular velocity as it rotates. Since a single rotating antenna is not actually employed, the nomenclature for this system might more correctly be "Quasi-Doppler VOR."

As indicated earlier, the reduced susceptibility to course deterioration resulting from obstacles around the site such as trees, buildings, etc. is due to the fact that the variable voltage is now contained in the sub-carrier frequency-modulated voltage. For bearing error (at the receiving point) to exist, there must be a combination of "right-bearing" (direct) information with "wrong-bearing" (reflected or reradiated) information. For the latter, the frequency deviation cycle is displaced in time from that of the former. If a reflected voltage, shifted 90 degrees in phase of deviation cycle, and having an amplitude of one-twentieth of the direct voltage, is added to the direct voltage, it would have little or no effect on the instantaneous frequency of the main voltage. This has been previously experienced in communications transmission on interfering frequency modulation transmissions, wherein the stronger signal takes over, and is known as the "frequency-modulation capture effect." The antenna aperture is related to this effect in that, with greater aperture, the overriding of unwanted signals is greater, since the frequency-modulation deviation is greater. By comparison, the effect of reflections on the 4-loop VOR system, utilizing a rotating figure of eight pattern, is quite large. With direct and reflected voltages as indicated above, the resultant would be the vector sum of the two. Hence, the tangent of the error angle would be one-twentieth or 0.05, corresponding to an error of about 3.0 degrees.

A wide-aperture Doppler VOR-beacon system has already been proposed in which the information relating to the direction is derived at the receiving end by employing the conventional types of receivers for receiving the signals of the customary VOR-beacon systems, from a frequency modulation impressed upon the transmitted waves. This frequency modulation is caused by the fact that on a circle with a diameter of several wavelengths, two exactly or approximately opposing antennas which are supplied with RF-energy, are simulated to rotate at the same speed in the same direction. The simulated rotation of the antenna is effected in the manner known per se with the aid of switching means. In order to adhere to the fixed standards of the conventional types of VOR-beacon systems, the one antenna is fed with about 90% of the total energy available from the transmitter, which is amplitude modulated with a voltage of 30 c.p.s. serving as the reference phase signal, while the other antenna radiates a carrier frequency differing in frequency by 9960 c.p.s. from the first frequency. On account of the interference between the two radio-frequency signals a beat frequency of 9960 c.p.s. is obtained at the receiving end, which is frequency modulated on account of the simulated rotation of the corresponding antenna at the rotational frequency which, like the reference phase signal, has a frequency of 30 c.p.s. The diameter of the antenna system at the transmitting end is chosen thus that the standardized deviation of 480 c.p.s., which is customary in the case of VOR-beacon systems, is adhered to.

In providing the approach beacon according to the invention, which operates with a frequency modulation, the conventional arrangements of linear antenna systems, as well as the principles of the already proposed Doppler-VOR-beacon systems are utilized with respect to the feeding of the antennas.

However, in the already proposed Doppler-type VOR-beacon system the direction information is contained in the phase of an alternating voltage with a constant amplitude, which disappears in the approach beacon according to the invention, in the correct direction, if the aircraft approaches on the course-setting beam. The amplitude of the alternating voltage signal which is capable of being derived from the Doppler-frequency is only produced in the case of some deviation or other from the course-setting beam, but the phase respectively remains constant. In the case of small drift angles (deviation angles) respectively the frequency deviation or the amplitude of the voltage is in proportion thereto, and the sign of the voltage indicates the left-hand or right-hand deviation from the course-setting beam (navigational line).

According to the invention the use of conventional VOR-receivers designed for cooperating with VOR-beacon systems, for receiving the signals of the localizer beacon for the purpose of determining a course line by the comparison between a directionally characterized and reference phase signal of 30 c.p.s. is assured in that a periodic movement in opposite directions of two single antennas of a linear antenna system is simulated at a speed corresponding to 30 c.p.s.

In designing the localizer beacon special care has been taken to keep the cost of the antenna system as low as possible, in other words, to achieve a sufficient frequency deviation with as few as possible antennas within the most important range from 0° to about 10°. For this reason, according to the further embodiment of the invention, the antenna base in its entire length is not equipped with antennas, whose spaced relationship is smaller than half the operating wavelength, but only a portion of the base, for example, the centre portion; which is considered to be the most favorable design. The spaced relations between the antennas arranged at the ends of the base and the adjacent ones thereto arranged towards the centre, may amount to several wavelengths. In this way a frequency-deviation pattern is produced which, in the case of slight deviations from the course-setting beam, which is determined by the mid-vertical on the antenna base, of course shows the necessary sharpness of the rise, but has a smaller maximum deviation than if the antenna base in its entire length were equipped with antennas.

In cases where it is furthermore required in accordance with ILS-standards, that the low frequency voltage derived from the frequency deviation produce at the output of the receiver an instrument indication or direct reading, in which the indicator deflection amounts to about four times the value of that indication which would be produced otherwise in the case of the same angular deviation from the course upon receiving a VOR-beacon signal, it can be easily calculated that the antenna base must have a length of about 40 meters, and that 22 antennas spaced therealong are sufficient.

Figure 2:
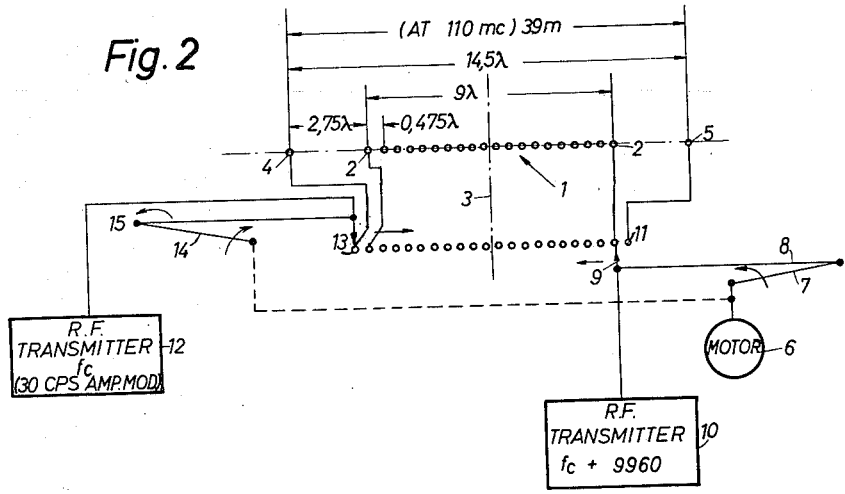
FIG. 2 is a Doppler VOR localizer beacon block diagram utilizing the linear antenna array of this invention.

Referring now to FIGURE 2, there is shown a VOR transmitter utilizing the antenna array 1 of this invention. The antenna array consists of a plurality of antennas linearly disposed and, as shown in this embodiment, consist of 22 single antennas of which 20 antennas 2 are arranged at a spaced relation of 0.475λ equally distributed about a course line 3 of the antenna array 1. The two single antennas 4 and 5 are arranged at the ends of the linear path at a distance of 2.75λ from the adjacent antennas. When transmitting at a frequency of 110 mc./s., the antenna array 1 will result in a length of 39 meters. A motor 6 rotating at a speed of 30 c.p.s. is coupled to a reciprocating linkage 7 and 8. At the end of the reciprocating linkage 8 is coupled a switch arm 9 to which is also coupled the output of a radio frequency transmitter 10 which generates a signal $f_c+9960$ c.p.s. Each of the antennas of the linear antenna array 1 is coupled to a contact 11 so that as the motor 6 rotates and the reciprocating linkage moves the switch arm 9 along the contacts 11, contact is made progressively and successively with every one of the antennas in the linear antenna array 1 with radiation from each one of the antennas successively of the signal $f_c+9960$. A second radio frequency transmitter 12 having a signal output of $fc$ amplitude modulated by 30 c.p.s. is coupled to a second switch arm 13 which is adapted to move along the switch contacts 11 in the same reciprocating manner as the switch arm 9 but in an opposite direction thereto. A reciprocating linkage 14 and 15 is coupled to the motor 6, so that linkage member 14 rotates in a direction opposite to linkage member 7. Therefore the switch arm 13 is moved along the contacts 11 and contact is progressively and successively made with every one of the antennas in the linear array 1 with each one of the antennas successively radiating the signal $fc$ amplitude modulated by 30 c.p.s. Preferably the audio frequency generator of 30 c.p.s. (not shown) used to amplitude modulate the carrier $fc$ is used to energize the motor 6 to provide synchronism of motor rotation and the amplitude modulation.

The antenna system is fed with high-frequency energy in the manner described in such a way that there is simulated a periodic movement of two antennas in opposite directions. The simulated movement or respectively the coupling to the transmitter is effected in steps, i.e. at unequal speeds, in the most simple manner in such a way that there is produced a sinusoidal increasing and decreasing speed of the simulated movement, in other words, that the speed equals zero at the two outer antennas, and reaches its highest value in the center. In this way, in the case of slight deviations from the course-setting beam ($\varphi<10.5°$) there is approximated a sinusoidal course of the frequency deviation.

The resulting frequency-deviation diagram which is caused by the scanning, respectively the amplitude of the fundamental wave of the scanning frequency is shown in curve 5 of FIG. 3 in cartesian coordinates in dependency upon the drift angle (azimuth $\varphi$ zero to 90°). Curve 5 showing the resulting frequency deviation is composed of two parts, namely of the frequency deviation, which is produced by the scanning of the antennas arranged at a spaced relation of 0.475 wavelengths (center portion), which is shown as a sinusoidal increasing portion in curve 2 of FIG. 3, and of the frequency deviation which is produced by the scanning of the respectively outer antennas 4 and 5 arranged at a spaced relation of 2.75 wavelengths. If this portion of the antenna array were equipped just like the center portion with antennas mounted at a spaced relation of 0.475 wavelength, then such a frequency deviation would result from the scanning of this portion, as is shown in curve 1 of FIG. 3 in a sinusoidal increasing manner. The sum of the frequency deviations which would result from the scanning of the center and of the two extreme portions of the base, if the base were equipped completely with antennas, would result in the curve 3 of FIG. 3. In reality, however, there results a portion of frequency deviation of the extreme antennas in accordance with the showing of curve 4, FIG. 3. As is well-known, the sign of the frequency deviation is reversed if the difference in transit time between two successively following antennas exceeds the value of half a wavelength, in other words, at a certain drift angle (first leap point at $\varphi_1 \cong 10.5°$) the frequency deviation is reversed to the same negative value, in order to increase again towards larger drift angles in accordance with the showing of curve 1, FIG. 3 in a sinusoidal fashion. If the transit-time difference amounts to three half-wavelengths (that is, $\varphi_2 \cong 33°$), then a second leap of the frequency deviation will result, and a further leap will result in the case of a difference of five half-wavelengths ($\varphi_3 \cong 65°$). The summation of curves 2 and 4 (FIG. 3) provides the resulting frequency deviation according to curve 5 (FIG. 3). A corresponding diagram will result when the above is plotted in polar coordinates.

It will be seen that in the close proximity of the course-setting beam up to a drift angle of 10.5°—and this is the range which at all is only of interest in the case of an approach localizer—the frequency deviation according to the sum of the two curves 1 and 3 increases, but that it decreases at the different leap points, and has finally a maximum value which only amounts to about 70% of the total value, than if the total antenna base were equipped with antennas arranged at a spaced relation of 0.475 wavelength. When selecting the number of antennas, the length of the antenna base, and when equipping them at the proper spaced relations care has to be taken that the sign of the frequency deviation is only reversed at such a small number of antennas that the fundamental wave of the low-frequency voltage, which is derived from the frequency modulation of the carrier wave, retains the sign (phase), and only reverses this sign at 0° and 180°. In other words, the resulting frequency-deviation diagram may have no ambiguities.

Curves 4a, 4b and 4c show the time relationships of the low-frequency voltage at the output of the discriminator, i.e. by respectively one quarter of a period. A Fourier-analysis, not particularly described herein, in relation to curve 5 of FIG. 3, which represents the respective amplitude of the fundamental wave, results purely qualitatively in the shape of the Doppler-frequency in the case of drift angles $\varphi$ of 10°, 15° or 30° respectively. In case $\varphi=10°$ the Fourier-analysis shows that the voltage increases in accordance with three steps (FIG. 4a). There disappear the third and the fifth upper harmonic, and only the seventh, even if only with a small amplitude, reappears. Between 10.5° and 33°, with respect to a mean value of $\varphi=15°$, there results a curve with a shape as shown in FIG. 4b. The second part of the curve is negative due to the leap point (FIG. 3, curve 4). Of course, now there appear higher upper harmonics, and also the fundamental wave has become smaller in accordance with curve 5 in FIG. 3. In the case of a drift angle of 30° (FIG. 4c) the portion of the frequency modulation, which is caused by the two outer antennas (curve 4, FIG. 3) has again become positive, but the fundamental wave still is substantially smaller (curve 5, FIG. 3) than it would have been in the case of the total array of antennas (curve 3, FIG. 3). Larger drift angles are uninteresting in the case of approach beacons (localizers) but rather important is the range between 0° and 10.5°, strictly speaking only the range between 0° and 2.5° is of interest, because when observing the respective ILS-standards the indicating instrument will show a full deflection in the case of a 2.5° drift off the course.

For the purpose of receiving the signals of an approach beacon designed in this way, there are supposed to be used the conventional types of VOR-receivers used for the reception of VOR-beacon signals that have a sub-carrier of 9960 c.p.s. modulated in frequency with 30 c.p.s., from which there is then derived a reference phase signal of 30 c.p.s., and which also have a 30 c.p.s. directionally characterized signal component which is derived from an amplitude modulation of the carrier wave. However, in the VOR-Doppler-beacon systems, the role of both the directionally characterized signal and of the reference phase signal is reversed which, of course, has no effect on the comparison of these two 30-c.p.s. components.

At a receiving site outside the mid-vertical on the antenna base, and by the beat of the two carrier waves which are transmitted by the approach beacon and spaced apart by 9960 c.p.s., there is formed in the VOR-receiver a low-frequency signal of 9960 c.p.s. which, because of the simulated movement of the antennas in opposite directions, is modulated in frequency on the array with the switching frequency of 30 c.p.s. Since two antennas are moved in opposite directions there is produced a frequency deviation of double the value of that produced in the case of one single apparently moving antenna, and one stationary antenna. The signal of 30 c.p.s. which is obtained by a frequency demodulation of the voltage of 9960 c.p.s. modulated in frequency with 30 c.p.s., is in the approach beacon the directionally characterized variable voltage signal, whose phase is independent of the direction to the beacon, and to which the receiver is tuned. Its amplitude and sign, however, are dependent upon the direction. One of the carrier waves which is radiated by the beacon is modulated in amplitude with 30 c.p.s. The 30-c.p.s. signal which is derived from this amplitude modulation at the receiving end, represents the phase-locked reference signal. By a comparison of this signal with the directionally characterized signal it can be determined on which side of the preferred direction—that is the mid-vertical on the base, where the frequency deviation equals zero, and where there exists no 30-c.p.s. directionally characterized signal—the receiver is located in the moment of the direction-(position)-finding. The drift off the course-setting beam is indicated in the conventional manner with the aid of a right-left indicator instrument.

The conventional types of VOR-receivers are designed in such a way that with the aid of a tag indication (visual indication) an alarm is given if one of the three above described voltage or signal components, namely the 9960 c.p.s., the 30 c.p.s. component which is derived from the first signal (9960 c.p.s.) by way of a frequency demodulation (in the case of VOR the reference signal, and in the case of the approach beacon (localizer) according to the invention the directionally characterized signal), and the 30-c.p.s. component which is derived from the amplitude modulation of the carrier wave (in the case of VOR the directionally characterized signal, and in the case of the localizer according to the invention the reference phase signal) does not appear at the output of the receiver, e.g. on account of a faulty reception. Accordingly, in the case of the approach beacon according to the invention this would be effected each time the aircraft flies its calculated course exactly along the course-setting beam.

In order to prevent the tag indication from becoming effective it is provided in accordance with the further embodiment of the invention that one of the two transmitters, outputs which are adapted to feed the two antennas which are simulated to move towards each other, by adhering to a small frequency deviation, is modulated in frequency with 30 c.p.s., in which case the phase of the 30-c.p.s. frequency modulation is periodically subjected to a polarity reversal with a low frequency of about 50 c.p.s. This frequency modulation (fundamental modulation) is added to the one produced by the Doppler-effect in order to form a resultant frequency modulation. It is either added thereto or subtracted therefrom, quite depending on either the drift of the aircraft off the course-setting beam (towards the left or the right), or on the sign of the respective frequency modulation which is caused by the Doppler-effect. However, since the fundamental modulation is subjected to a polarity reversal with respect to phase with a frequency of 5 c.p.s., and since the indicating instrument is incapable of following this polarity reversal, an indication is suppressed with respect to the direction. The tag indication, however, receives a 30-c.p.s. signal which is derived from the fundamental modulation with the aid of a non phase-sensitive demodulation, by which the operation of the tag indication is suppressed.

While we have described above the principles of our invention in connection with specific apparatus, it is to be clearly understood that this description is made only by way of example and not as a limitation to the scope of our invention as set forth in the objects thereof and in the accompanying claims.

We claim:
1. A Doppler VOR beacon having a frequency deviation directional pattern to produce an aircraft landing path comprising a plurality of antennas disposed in a linear array, a first transmitter having an output of a first frequency, a second transmitter having an output of a second frequency, switching means coupling the output of said first and second transmitter successively and cyclically to each said antenna, said output of said first transmitter being amplitude modulated at the switching frequency, whereby said switching means simulate an antenna motion to produce said frequency deviation directional pattern.

2. A Doppler VOR beacon having a frequency deviation directional pattern to produce an aircraft landing path comprising a plurality of antennas disposed in a linear array, a first transmitter having an output of a first frequency, a second transmitter having an output of a second frequency, switching means coupling the output of said first and second transmitter successively and cyclically to each said antenna in a to and fro motion at an audio frequency, said output of said first transmitter being amplitude modulated at the switching frequency, whereby said switching means simulate an antenna motion to produce said frequency deviation directional pattern.

3. A Doppler VOR beacon according to claim 2 wherein said antennas are unequally spaced apart in said linear array.

4. A localizer approach beacon utilizing frequency modulation caused by the Doppler effect and having a desired frequency deviation directional pattern comprising a plurality of antennas disposed in a linear antenna array symmetrically arranged in relation to a guide beam produced by said directional pattern, a first transmitter having a carrier frequency output F, a second transmitter having a carrier frequency output $F+f$, switching means to produce said directional pattern with simulation of an antenna motion equivalent to a synchronous, opposite motion of two discrete antennas by successively and cyclically coupling said outputs of said first and second transmitters to said antennas of said array, said first carrier frequency F being amplitude modulated with a sine wave at the switching frequency and the energy ratio of said transmitter outputs being chosen so that the mixing of the two frequencies results in a beat frequency $f$.

5. A localizer approach beacon according to claim 4 further including a modulating signal of the same frequency as the switching frequency and means to modulate at least one of said carrier signals with said modulating signal and means to reverse the phase of said modulation in a slow rhythm.

6. A localizer approach beacon according to claim 4 wherein said antennas are disposed at unequal spacings in said linear antenna array so that the separation between the antennas in the center portion of said array amounts to less than half a wavelength and the separation between the antennas at the extreme ends of the array amounts to more than half a wavelength.

7. A localizer approach beacon according to claim 6 wherein the simulated movement of the two discrete antennas is determined by selecting both the coupling velocity of the switching means and the separation between said antennas of said array in such a manner that the fundamental wave of the switching frequency resulting in the case of small drift angles off the guide beam has a minimum of possible harmonics and the fundamental wave is subject to a phase reversal only at 0° and 180°, respectively.

8. A localizer approach beacon according to claim 4 wherein said frequency difference $f$ between the carrier frequencies is 9960 c.p.s., the switching frequency and the modulating frequencies of both the first and second carrier frequency, amplitude modulation or frequency modulation respectively, are 30 c.p.s. and the degree of modulation of the amplitude modulation of the carrier frequency so modulated is about 30 percent and the power ratio of the radio frequencies fed to said linear antenna array is approximately 9:1.

References Cited in the file of this patent
UNITED STATES PATENTS
2,411,518    Busignies _____ Nov. 26, 1946